April 16, 1929.  J. J. UHLMAN ET AL  1,709,417
SAFETY BRAKE STICK
Filed March 10, 1927

Inventors
J. J. Uhlman,
E. H. Johnson,

By Clarence A. O'Brien
Attorney

Patented Apr. 16, 1929.

1,709,417

UNITED STATES PATENT OFFICE.

JOHN J. UHLMAN AND ELLIE H. JOHNSON, OF HARLAN, KENTUCKY.

SAFETY-BRAKE STICK.

Application filed March 10, 1927. Serial No. 174,388.

This invention relates to new and useful improvements in brake sticks and has for its primary object to provide a highly novel, simple and inexpensive stick for the use in actuating car brake wheels and for dispensing with the usual wooden sticks now generally employed for this purpose.

It is very well known in the braking of cars that frequently the use of a wooden brake stick will cause the forward pitching of the brakeman should the same slip or break. In the present instance we provide a heavy metallic stick having a hook at one end thereof for hooked engagement around the vertical brake shaft and for disposition through the spokes of the wheel so that there will be no liability of the stick breaking or slipping from associated relation with respect to the wheel.

With the foregoing and other objects in view as the nature of the invention will be better understood the same comprises the novel form, combination and arrangement of parts hereinafter more fully described, shown in the accompanying drawing and claimed.

In the drawing wherein like reference characters indicate corresponding parts in the several views.

Figure 1:
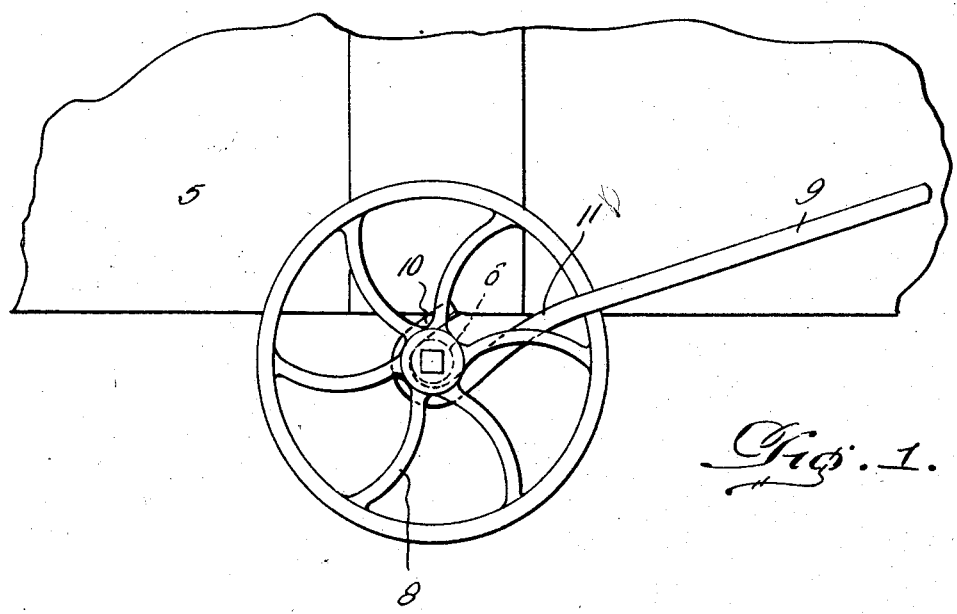
Figure 1 is a fragmentary top plan view of one end of a conventional freight car having in position thereabove a brake wheel in operative association with which is our improved brake stick.

Now having particular reference to the drawing, 5 designates generally an ordinary freight car, while 6 designates the usual brake shaft at the end thereof and upon the upper end of which is mounted a conventional brake wheel 7, including curved spokes 8.

Figure 2:
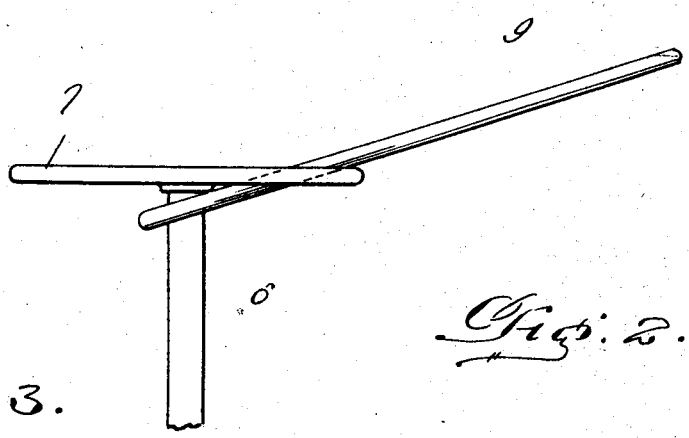
Figure 2 is a side elevation of a part of the brake shaft and wheel disclosing again our device as associated therewith.
Figure 3:
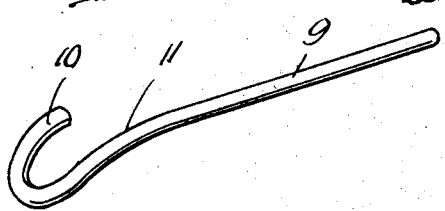
Figure 3 is a perspective of the brake stick, per se.

Our invention per se consists of a somewhat elongated heavy metallic bar 9 preferably of circular formation in cross section and being so bent at one end as to provide a hook 10. The shaft portion of this stick is slightly curved inwardly adjacent the hooked end as at 11. As clearly disclosed in Figures 1 and 3, the hooked end 10 of the brake stick is first extended downwardly between a pair of the brake wheel spokes 8 after which the hook 10 is engaged over the brake shaft 6 directly beneath the wheel. The curved portion 11 of the stick proper engages the curved adjacent spoke as clearly disclosed in Figure 2, while the stick proper is rested upon the rim of the wheel directly adjacent the curvature 11 so that a forward pushing of the stick will occasion the proper turning of the wheel 8 resulting in the braking of the car. Furthermore by reason of a stick of this character there will be absolutely no liability of the stick becoming broken or slipping from associated relation with the wheel which is an ever present danger in the use of straight wooden brake sticks.

Having thus described the invention, what we claim is:—

In a brake stick for facilitating turning of railway car brake wheels, a solid elongated metallic bar adapted for disposition between the adjacent spokes of the brake wheel and for contact at a point inwardly of the inner end of the foremost one of the pair of spokes, a hook formed on the inner end of the stick for engagement about the brake shaft directly beneath the brake wheel, said bar being slightly bent inwardly toward the hook adjacent the latter for engagement with the other spoke of said pair, the intermediate portion of the bar adapted to rest on the rim of the brake wheel, the outer end of the bar forming an actuating handle.

In testimony whereof we affix our signatures.

JOHN J. UHLMAN.
ELLIE H. JOHNSON.